(12) United States Patent
Sparks et al.

(10) Patent No.: US 9,979,885 B2
(45) Date of Patent: May 22, 2018

(54) APPARATUS AND METHOD FOR CAPTURE OF 360° PANORAMIC VIDEO IMAGE AND SIMULTANEOUS ASSEMBLY OF 360° PANORAMIC ZOETROPIC VIDEO IMAGE

(71) Applicants: Steven Christopher Sparks, Atlanta, GA (US); John William Kastelic, Atlanta, GA (US); Scott William Lootens, Atlanta, GA (US)

(72) Inventors: Steven Christopher Sparks, Atlanta, GA (US); John William Kastelic, Atlanta, GA (US); Scott William Lootens, Atlanta, GA (US)

( * ) Notice: Subject to any disclaimer, the term of this patent is extended or adjusted under 35 U.S.C. 154(b) by 291 days.

(21) Appl. No.: 15/018,835

(22) Filed: Feb. 8, 2016

(65) Prior Publication Data
US 2017/0230576 A1    Aug. 10, 2017

(51) Int. Cl.
*H04N 5/232*    (2006.01)

(52) U.S. Cl.
CPC ..... *H04N 5/23238* (2013.01); *H04N 5/23222* (2013.01); *H04N 5/23293* (2013.01); *H04N 5/23219* (2013.01)

(58) Field of Classification Search
CPC .......... H04N 5/23238; H04N 5/23293; H04N 5/23222; H04N 5/23219
See application file for complete search history.

(56) References Cited

U.S. PATENT DOCUMENTS

| | | | | |
|---|---|---|---|---|
| 5,912,670 A | * | 6/1999 | Lipscomb | G06T 15/10 345/419 |
| 6,118,474 A | * | 9/2000 | Nayar | G02B 13/06 348/36 |
| 6,195,204 B1 | * | 2/2001 | Nalwa | G02B 27/1066 348/36 |
| 6,256,058 B1 | * | 7/2001 | Kang | H04N 5/23238 348/207.99 |
| 2014/0125761 A1 | * | 5/2014 | Morimura | H04N 5/23238 348/36 |

* cited by examiner

*Primary Examiner* — Sath V Perungavoor
*Assistant Examiner* — Howard D Brown, Jr.

(57) ABSTRACT

An electronic device comprises a display and a 360° variable planar panoramic video controller to present on the display a capture screen to guide the user to capture a near-seamless 360° panoramic video image. Simultaneously with the completion of the video capture, a 360° panoramic zoetropic video image is assembled from still images selected at intervals during the 360° continuous directional physical rotation of the electronic capture device.

11 Claims, 5 Drawing Sheets

APPARATUS AND METHOD FOR CAPTURE OF 360° PANORAMIC VIDEO IMAGE AND SIMULTANEOUS ASSEMBLY OF 360° PANORAMIC ZOETROPIC VIDEO IMAGE

CROSS-REFERENCE TO RELATED APPLICATIONS

This application claims the benefit of U.S. Provisional Application No. 62/113,826, filed Feb. 9, 2015, the disclosure of which is incorporated herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC INDEX

Not applicable.

BACKGROUND OF THE INVENTION

The invention relates generally to the field of electronic message communications and in particular video message communications. More particularly this invention relates to the capture by an electronic video recording device of a 360° panoramic video image and the simultaneous assembly of a 360° panoramic zoetropic video image intended for distribution across social network and social messaging services.

Devices and methods for the capture of still and video images are ubiquitous; however, there are fewer tools for users of social networks and social messaging services to quickly create in real-time edited video assemblages for transmission and sharing; further still, the current state of the art lacks, inter alia, a method that guides a user to capture a 360° panoramic video image and that simultaneously assembles in real-time a compressed zoetropic video image from said 360° panoramic video image which simulates the kinetic energy of the user's environment and surroundings in a near-seamless 360° panoramic, zoetropic video image that allows for immediate transmission by the user to both social networks and via social messaging services.

A social network service is an online service, platform or site that facilitates the building and maintenance of social relations among individuals. A social network service typically will allow each member of such social network service to maintain a profile with user information and user posts which may be comments, photos, videos and the like. Social messaging services facilitate communication between individuals by providing for the transmission and exchange of messages, including as part thereof, photos, videos and the like. Posts within a profile located on a social network or messages sent via a social messaging service may be from the users or from persons/individuals that the user is affiliated with in the social network or more generally posted and/or transmitted by and/or to the general public. In this way social network sites and social messaging services allow users to share ideas, activities, events and interests with affiliated individuals and the general public.

The popularity and ubiquity of both social network services and social messaging services has created a demand for new ways for users of both to easily create, present and share in real-time information including still and video images of themselves, i.e., "selfies", and still and video images that capture their life experiences, friends and family, travel, interests, activities and the like.

Accordingly, improved techniques for the communication and sharing of information through video images are desirable.

SUMMARY OF THE INVENTION

Disclosed is a method (and/or system) for an electronic video capture device that displays a 360° variable planar panoramic video controller for directing a user to capture a 360° degree panoramic video image, on a single plane (typically horizontal) or multiple planes, and associated audio by prompting and concurrently measuring the device user's continuous directional physical rotation, automatically stopping the video image capture at the completion of a full 360° physical rotation (or any path of an arc selected by user less than 360°), and including a set of alignment marks presented on the capture screen to allow the user to both maintain user's self image as the center of focus and stabilization of the electronic video capture device on a single plane, or across variable planes and returning to the original heading at which video capture commenced, to create the illusion of the user remaining stationary amidst a rapidly passing background in a simultaneously assembled 360° panoramic zoetropic video image, that is, producing the illusion of motion by displaying a sequence of photos from a pre-set or user selected interval of degrees showing progressive phases of that continuous directional motion. Alternatively, a user may turn the centripetal focus of the electronic capture device outwards from user to create a centrifugally focused 360° panoramic video image and associated 360° panoramic zoetropic video image.

The invention describes a method (and/or system) of utilizing an electronic video capture device in combination with an embedded magnetometer or similar compass-like device enabling the measurement of the azimuth to direct and enable a user via a stop/start button or a touch controller to identify haptic contact to start the capture of a video self-image (or centrifugally focused image) throughout a continuous directional circular measure of their physical rotation on a single plane or on variable planes from an azimuth of 0° to 360° and then stopping when reaching a complete rotation at the heading of the original commencement of video capture creating a 360° panoramic video image and associated audio. Individual still images from the full panoramic video image (movie) are copied at pre-set or user selected intervals based on the measurement of the azimuth from the heading of the start of the video capture and then simultaneously assembled into a 360° panoramic zoetropic video image that gives the viewer the illusion of a near-seamless 360° panoramic video image. The alignment of the juxtaposition of the start and finish of the video capture at the start heading has as a result an assembly of still images to create a virtually seamless 360° panoramic zoetropic video image either featuring the user remaining stationary against a rapidly passing panoramic view of the user's surroundings from the point of view of the user, a 360° view of a centrally focused object or tableau in the video image capture or an outward view akin to what one experiences on a playground roundabout, swivel stool or similar spinning device.

BRIEF DESCRIPTION OF THE SEVERAL VIEWS OF THE DRAWINGS

The invention is more fully appreciated in connection with the following detailed description taken in conjunction with the accompanying drawings, in which.

It is noted that wherever practicable similar or like reference numbers may be used in the several figures and may indicate like or similar functionality.

DETAILED DESCRIPTION OF THE INVENTION

Figure 1:
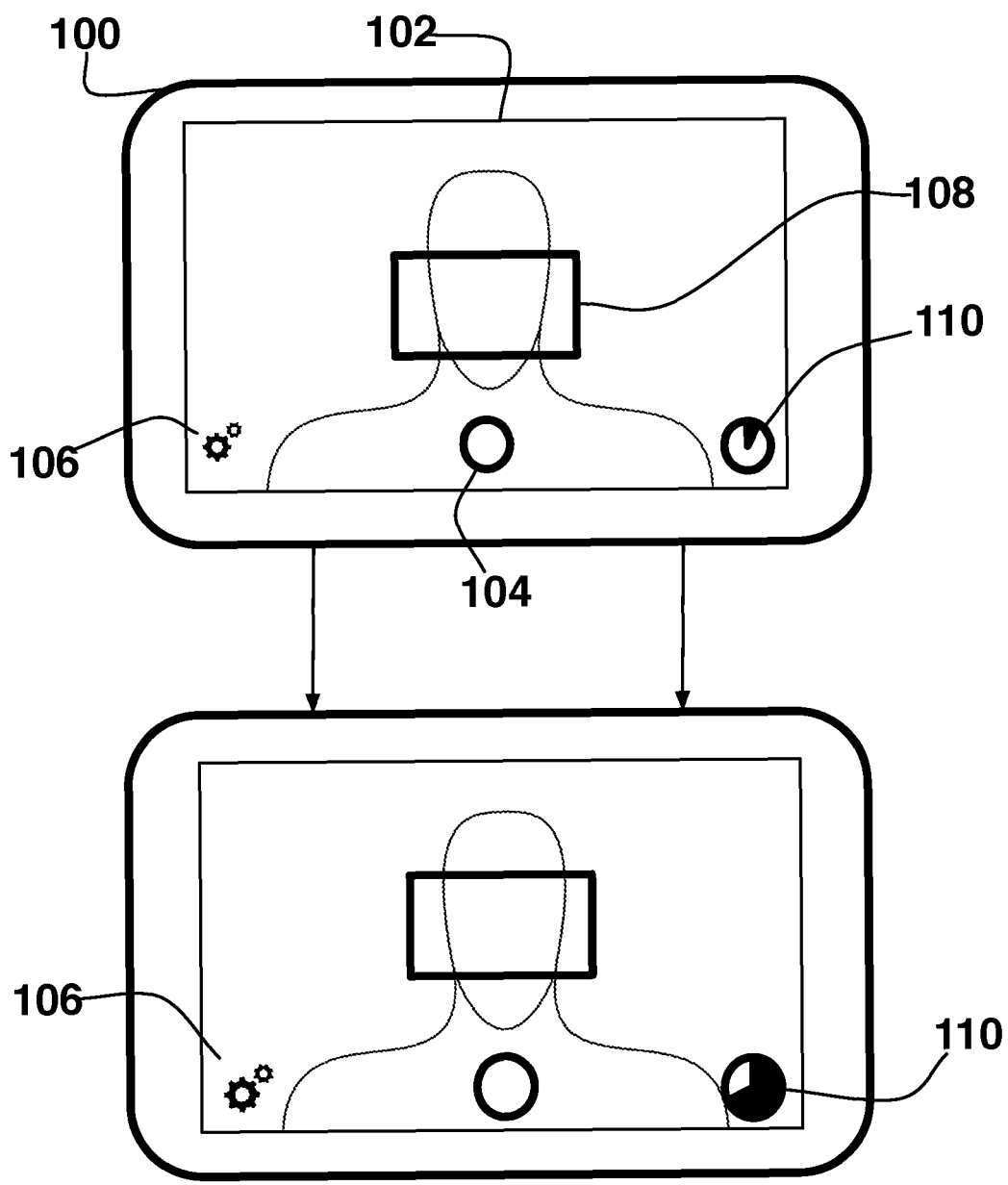
FIG. 1: Illustrates the 360° variable planar panoramic video controller capture screen displayed on an electronic video capture device implementing the 360° variable planar panoramic video controller in accordance with the invention.

FIG. 1 illustrates an electronic video capture device 100 which in one embodiment may be a smartphone implementing the invention. A user interface for the 360° variable planar panoramic video controller (206) appears on the exterior display 102 of the electronic video capture device 100 including a user control which may be a haptic touch controller for initiating video capture 104, a second user control which may be a haptic touch controller for selecting and/or overriding the settings of the 360° variable planar panoramic video controller 106, a semi-transparent reticle 108 for the user to maintain focus and stabilization of the electronic video capture device 100 and an animated graphic progress indicator 110 to alert the user to the progress of the continuous directional physical rotation of the electronic video capture device 100.

Figure 2:
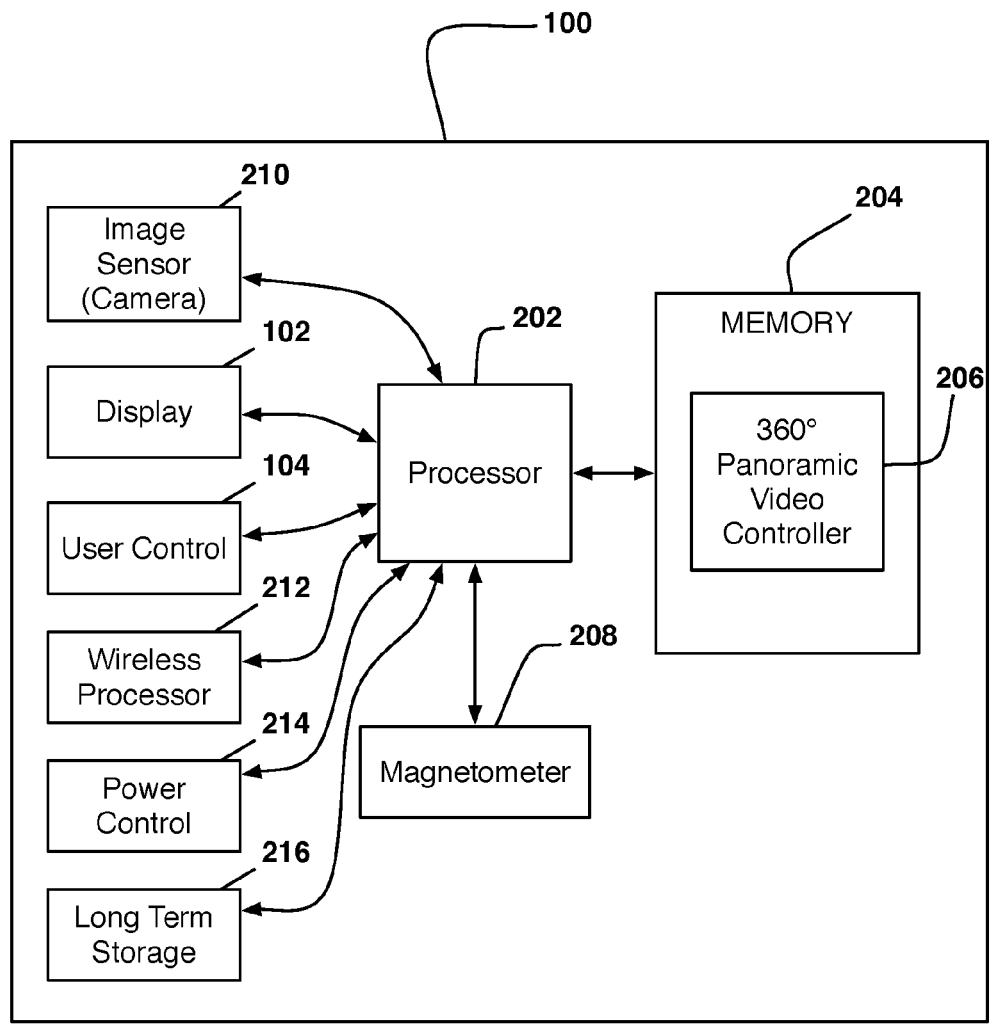
FIG. 2: Illustrates components of an electronic video capture device implementing the display of the 360° variable planar panoramic video controller in accordance with the invention.

FIG. 2 illustrates an electronic video capture device (100) implementing operations of the invention. In one embodiment, the electronic video capture device (100) is a smartphone with a processor 202 in communication with a memory 204. The processor 202 may be a central processing unit and/or a graphics-processing unit. The memory 204 is a combination of flash memory and random access memory. The memory 204 stores a 360° variable planar panoramic video controller 206 to implement operations of the invention. The 360° variable planar panoramic video controller 206 includes executable instructions to cause the capture through the electronic video capture device (100) of a 360° continuous panoramic video image (movie) of the user's immediate surroundings (or centrifugally focused object, tableau or panorama), select and/or override settings for the video image capture, and the storage, deletion and/or publishing and/or sharing of the captured video image (movie) and an assembled panoramic zoetropic video image with social network and social messaging services. The speed of the physical rotation of the electronic video capture device (100) is controlled by the user but the video image capture is stopped by the 360° variable planar panoramic video controller 206 when a magnetometer or similar compass-like device 208 detects that the electronic video capture device (100) has completed a full 360° continuous directional physical rotation. A full 360° continuous directional physical rotation is the default setting for the stopping of the electronic video capture device (100), however in one embodiment the settings may be overridden and specified by the user (108).

The processor 202 is also coupled to image sensors/camera 210. The image sensors/camera 210 may be known digital image sensors, such as charge-coupled devices or a similar camera-like device. The image sensors/camera capture the visual image (movie) which is presented on the display (102) during the user's 360° physical rotation.

Figure 4:
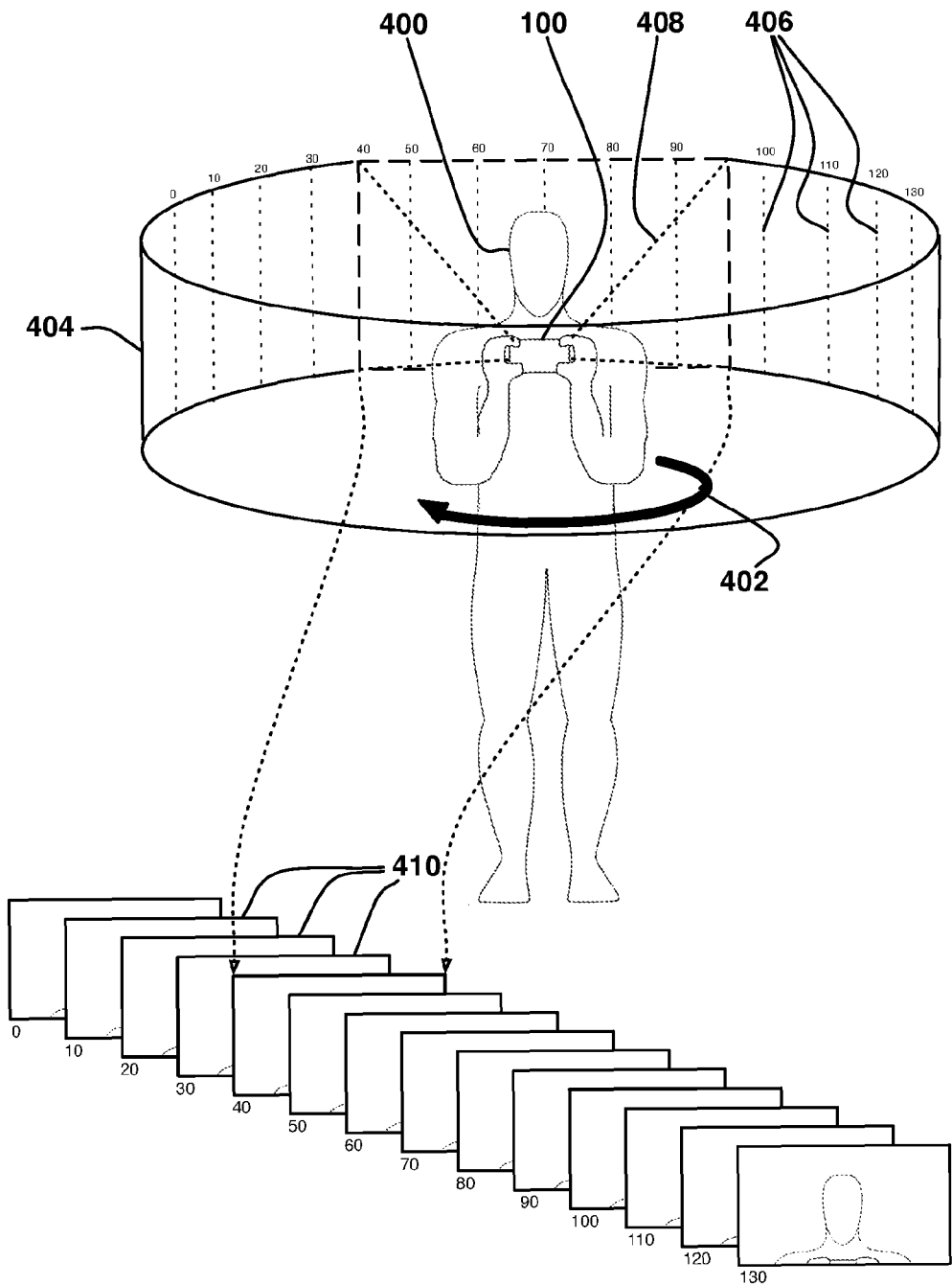
FIG. 4: Illustrates a user of an electronic video capture device utilizing the 360° variable planar panoramic video controller in accordance with the invention.

A user control (104) is connected to the display (102) and the processor 202. In one embodiment the user control (104) is a touch controller responsive to haptic signals applied to the display (102). The 360° variable planar panoramic video controller monitors signals from the user control/touch controller (104). If haptic contact is observed by the touch controller (104) then the 360° variable planar panoramic video controller begins video image (movie) capture. For example, the user will tap the user control (104) with a finger while holding the electronic video capture device (100) with the user's other free hand and focused on the user's self-image (FIG. 4). In one embodiment of the invention the haptic contact of the user is prompted by the image of the user control (104) which when touched commences a "countdown" such as "Lights! Camera! Action!" or similar notification to prepare user for the commencement of video image (movie) capture.

The electronic device (100), in addition to the magnetometer 208, may also include other components commonly associated with a smartphone, such as a wireless signal processor 212, a power control circuit 214 and a source of long-term digital storage, i.e., Flash memory, a hard drive or a solid state drive, etc. 216. While many of the components of FIG. 1 are known in the art, new functionality is achieved through the 360° variable planar panoramic video controller 206.

Figure 3:
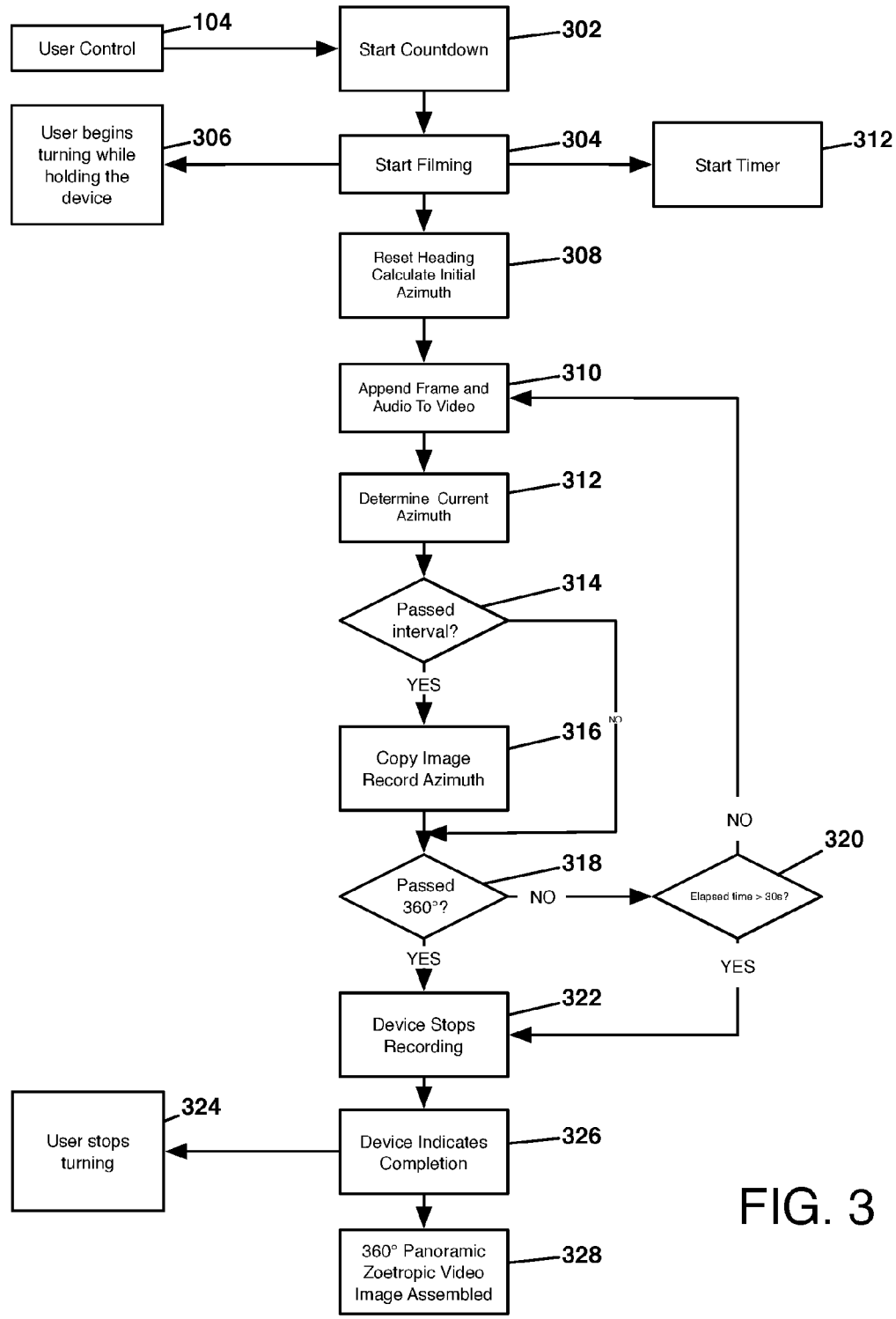
FIG. 3: Illustrates processing operations associated with an embodiment of the invention in an electronic capture device.

FIG. 3 illustrates processing operations associated with the 360° variable planar panoramic video controller (206). Initially the capture screen appears on the display (102) featuring a user control (104), which may be a haptic touch controller. If haptic contact is observed by the touch controller the 360° variable planar panoramic video controller (206) begins a countdown 302 to initiate video image capture 304 whereupon the user commences a continuous directional physical rotation 306 while holding the electronic video capture device (100). Concurrently the magnetometer (208) then resets and records the current heading 308. The initiation of video image capture 304 may also simultaneously start a timer 312. The magnetometer and the timer may be associated with the processor (202).

The 360° variable planar panoramic video controller 206 then instructs the processor (202) to append frame and audio to the video 310. The magnetometer (208) begins to calculate the physical rotation of the electronic video image capture device (100) from the initial heading recorded 310. The azimuth is then monitored 312 while the user continues his/her continuous directional physical rotation 306 holding the electronic video capture device 100 (FIG. 4). During the physical rotation of the video capture device at designated intervals 314, such as every 10°, the 360° variable planar panoramic video controller (206) copies a still image from the captured video image (movie) and records the associated azimuth 316. Filming continues until the magnetometer (208) detects that a full 360° physical rotation of the electronic video capture device (100) has been completed (318—Yes) or the timer has elapsed a pre-set maximum time (320—Yes), then the video capture device is stopped 322 and the user is prompted to stop physical rotation 324, 326. If the user stops his/her physical rotation at less than a full 360° rotation, video image capture continues but may be stopped by direct user control (104) or in one embodiment automatically stopped when the pre-set default timer providing for a maximum video image capture length is exceeded (320—Yes) or in another embodiment where a user has selected an arc for video image capture of less than a full 360°. The display (102) then indicates completion 326. The 360° variable planar panoramic video controller (206) then immediately presents on the display (102) the assembled 360° panoramic zoetropic video image 326. In another embodiment of the invention, the 360° variable planar panoramic video controller (206) may instruct or prompt the user to create or attach audio to the 360° panoramic zoetropic video image.

FIG. 4 Illustrates the user 400 holding the electronic video capture device (100) with a centripetal self-focus during his/her physical rotation of the electronic video capture device 402 to capture a 360° panoramic video image (movie) 404. During the continuous directional physical rotation 402 the 360° variable planar panoramic video controller (206) copies still images from the 360° panoramic video image (movie) 404 at pre-set intervals, e.g., every 10° 406 or, in one embodiment, at intervals selected by the user by modifying the settings (106) of 360° variable planar panoramic video controller (206). The 360° variable planar panoramic video controller (206) then assembles the copied still images 404 into a short, typically less than three (3) seconds, 360° panoramic zoetropic video image 410 made available in real-time on the display (102) for viewing by user and sharing/publishing by user on social networks and by way of social messaging services. In another embodiment of the invention, the 360° variable planar panoramic video controller (206) may enable a user to stop video capture at a heading and then recommence video capture from the same heading, and then instruct or prompt the user to stitch together multiple video image captures to create a continuous 360° panoramic zoetropic video image.

Because of the differential of the focal length 408 as between the electronic video capture device (100) and the user 400 as compared to the focal length between the electronic video capture device (100) and the individual copied still images of the 360° panoramic video image (movie) 406 captured by the electronic video capture device (100) implementing the 360° variable planar panoramic video controller (206), the 360° panoramic zoetropic video image created by the 360° variable planar panoramic video controller (206) the user 400 is perceived by a viewer of the 360° panoramic zoetropic video image as comparably stationary while the immediate surroundings (or outwardly focused object, tableau or panorama) of the user 400 captured by the electronic video capture device (100) implementing the 360° variable planar panoramic video controller (206) create an illusion of the immediate surroundings (or outwardly focused object, tableau or panorama) of the user 400 rapidly speeding by the user simulating the kinetic energy of the viewer assuming the position of the user 400 experiencing a vertiginous sensation as if viewer were on a carousel, a playground roundabout, a swivel stool or similar spinning device. The guiding by the 360° variable planar panoramic video controller (206) of the user's continuous directional physical rotation to measure and complete a full 360° physical rotation (312) combined with the assembly of the 360° panoramic zoetropic video image from the still images (316) copied from the 360° video image capture (movie) at pre-set intervals 406, 410 creates for a viewer a virtually seamless zoetropic panoramic video of the user 400 centered in the user's immediate surroundings (or centrifugally focused object, tableau or panorama) captured during the video image capture (movie).

Figure 5:
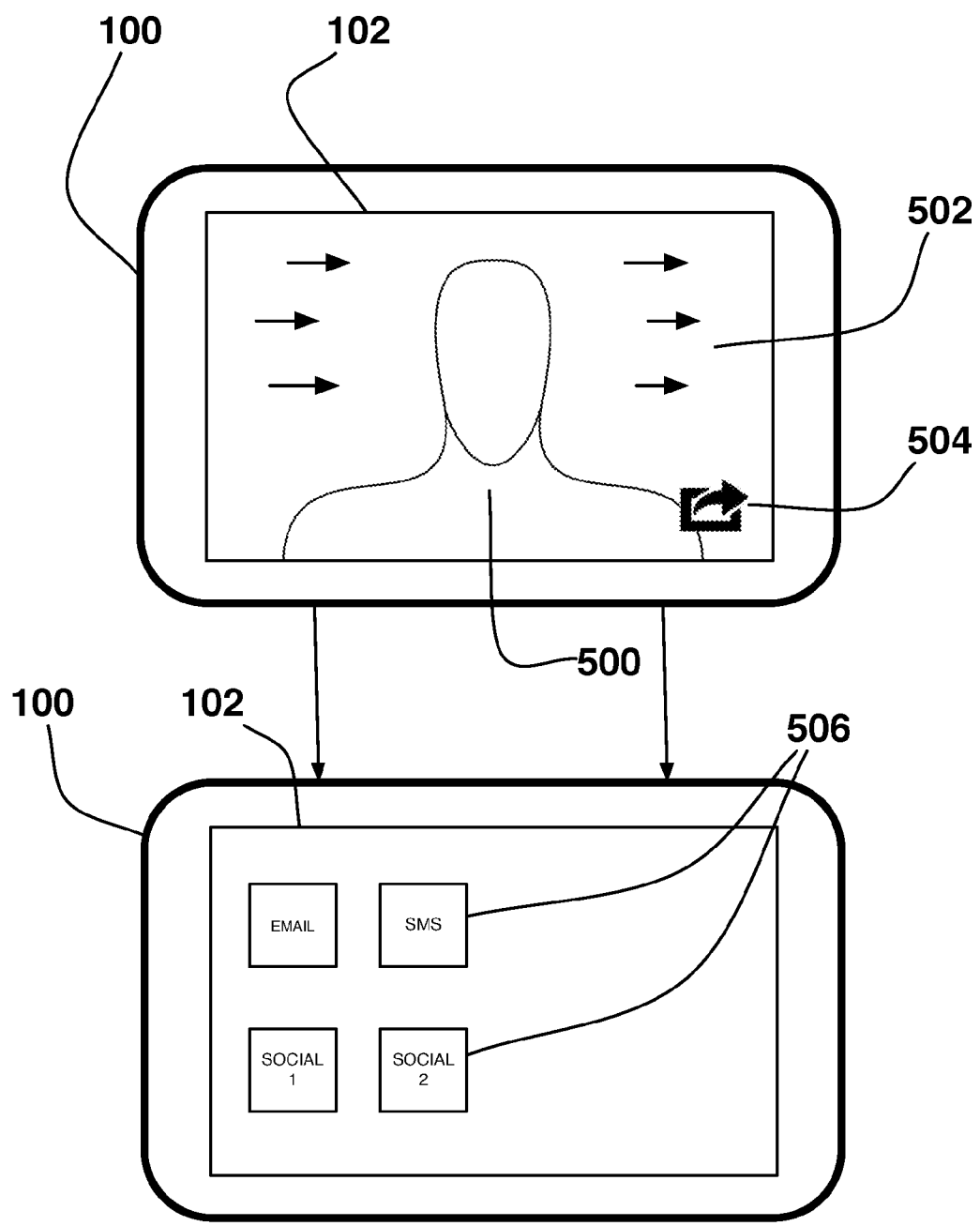
FIG. 5: Illustrates the exterior display of an electronic video capture device following the stopping of the panoramic video image capture implementing the 360° variable planar panoramic video controller in accordance with the invention.

FIG. 5 illustrates the exterior display (102) of an electronic video capture device (100) following the completion of the video image capture (movie) and simultaneous assembly by the 360° variable planar panoramic video controller (206) of the 360° panoramic zoetropic video image 502 together with a haptic touch controller 504 on the display for sharing and/or publishing the 360° panoramic zoetropic video image 502. An embodiment of the invention will also include haptic controls to allow users to caption and immediately share and/or publish 506 both, at user's election, the captured 360° panoramic video image (movie) and/or the 360° panoramic zoetropic video image to social networks, for transmission via social messaging services and for sharing and/or publishing elsewhere on the Internet or through user's email clients.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy discs and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented by using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

It is intended that the following claims and their equivalents define the scope of the invention:

1. A method for a 360° variable planar panoramic video image controller with instructions executed by a processor to: present on a display a set of alignment marks and/or an oval or circular reticle or similar visual guide enabling a user to maintain centripetal focus on a single plane or multiple planes of the video capture device in a continuous direction of the user throughout a 360° continuous directional physical rotation by user; present on a display a system of controls for the 360° variable planar panoramic video image controller that allows user to modify the default settings; present on a display an image of a progress indicator that utilizing a magnetometer or compass-like device embedded in the video capture device progressively tracks and displays the azimuth from 0° to 360° and/or illustrates a progressive rotation via a pie chart or similar animated graphic on the video capture screen to guide the user to complete a full 360° continuous directional physical rotation of the video capture device; receive from a user control a signal to commence video image (movie) capture which may either have a centripetal focus or a centrifugal focus from the center of the 360° physical rotation of the user; wherein the 360° variable planar panoramic video controller writes and appends frames during the 360° continuous directional physical rotation to the video image (movie); wherein the 360° variable planar panoramic video controller copies still images from the captured video image (movie) at pre-set or user specified intervals, e.g., every 10° throughout the entire 360° physical rotation; wherein concurrently or upon the completion of the video image (movie) capture the copied still images are automatically assembled into a 360° panoramic zoetropic video image of the user's immediate surroundings or centrifugally focused object, tableau or panorama; automatically stops the video image (movie) capture when the magnetometer detects that the electronic video capture device has completed a full 360° physical rotation (or a shorter user defined segment, e.g., 180°), is stopped by user or is stopped after a defined amount of time has elapsed; receive from a user control a signal to stop continuous directional video capture at a heading and then a further user control to signal the restart of video capture from the same heading; present on a display the assembled 360° panoramic zoetropic video image or instruct or prompt the user to stitch together multiple video image captures in the event of non-continuous directional video capture to create a continuous 360° panoramic zoetropic video image for viewing, captioning, storage and/or deletion; store the 360 panoramic zoetropic video image as well as the full 360° panoramic video image and audio (movie) in the memory of the electronic video capture device for retrieval for publishing and/or sharing across social network services and social messaging service, future access and viewing on user's video capture device; and present on a display prompts for user to publish and/or share the 360° panoramic zoetropic video image via email clients, SMS text, social networks and/or social messaging services.

2. The 360° variable planar panoramic video controller of claim 1 where the 360° variable planar panoramic video image controller displays a video capture screen for directing the user to capture a 360° panoramic video image.

3. The 360° variable planar panoramic video controller of claim 1 wherein the 360° variable planar panoramic video image controller calculates the azimuth to assure a complete 360° continuous directional physical rotation of the electronic video image capture device.

4. The 360° variable planar panoramic video controller of claim 1 wherein the 360° variable planar panoramic video image controller copies still images from the video image capture (movie) and concurrently or upon completion of the video image capture (movie) assembles a continuous directional 360° panoramic zoetropic video image.

5. The 360° panoramic video controller of claim 1 wherein the 360 panoramic video image (movie) and audio and/or the 360 panoramic zoetropic video image is upon user control which may be a haptic control is captioned, stored, deleted and or published and/or shared on social networks, social messaging services, email clients or other means of electronic communication.

6. A non-transitory computer readable storage medium, storing instructions thereon to be executed by a processor to cause the processor to: present on a display a set of alignment marks and/or an oval or circular reticle or similar visual guide enabling a user to maintain centripetal focus on a single plane or multiple planes of the video capture device in a continuous direction of the user throughout a 360° continuous directional physical rotation by user; present on a display a system of controls for the 360° panoramic video image controller that allows user to modify the default settings; present on a display an image of a progress indicator that utilizing a magnetometer or compass-like device embedded in the video capture device progressively tracks and displays the azimuth from 0° to 360° and/or illustrates a progressive rotation via a pie chart or similar animated graphic on the video capture screen to guide the user to complete a full 360° physical rotation of the video capture device; receive from a user control a signal to commence video image (movie) capture which may either have a centripetal focus or a centrifugal focus from the center of the 360° continuous directional physical rotation of the user; receive from a user control a signal to stop continuous directional video capture at a heading and then receive a further user control to signal the restart of video capture from the same heading; wherein the 360° variable planar panoramic video controller writes and appends frames during the 360° physical rotation to the video image (movie); wherein the 360° variable planar panoramic video controller copies still images from the captured video image (movie) at pre-set or user specified intervals, e.g., every 10° throughout the entire 360° continuous directional physical rotation; wherein concurrently or upon the completion of the video image (movie) capture the copied still images are automatically assembled into a 360° panoramic zoetropic video image of the user's immediate surroundings or centrifugally focused object, tableau or panorama; automatically stops the video image (movie) capture when the magnetometer detects that the electronic video capture device has completed a full 360° physical rotation, is stopped by user or a defined amount of time has elapsed; present on a display the assembled 360° panoramic zoetropic video image or instruct or prompt a user to stitch together multiple video image captures in the event of non-continuous directional video capture to create a continuous 360° panoramic zoetropic video image for viewing, captioning, storage and/or deletion; store the 360° panoramic zoetropic video image as well as the full 360° panoramic video image and audio (movie) in the memory of the electronic video capture device for retrieval for publishing and/or sharing across social network services and social messaging service, future access and viewing on user's video capture device; and present on a display prompts for user to publish and/or share the 360° panoramic zoetropic video image via email clients, SMS text, social networks and/or social messaging services.

7. The non-transitory computer readable storage medium of claim 6 further comprising instructions executed by the processor to display a video capture screen for directing the user to capture a 360° panoramic video image.

8. The non-transitory computer readable storage medium of claim 6 further comprising instructions executed by the processor to cause a magnetometer or compass like device to calculate the azimuth to assure a complete 360° continuous directional physical rotation of the electronic video image capture device.

9. The non-transitory computer readable storage medium of claim 6 further comprising instructions executed by the processor to copy still images from the video image capture (movie) and concurrently or upon completion of the continuous or non-continuous video image capture (movie) assembles a 360° panoramic zoetropic video image.

10. The non-transitory computer readable storage medium of claim 6 further comprising instructions executed by the processor which upon user control which may be a haptic control, the 360° panoramic video image (movie) and audio and/or the 360° panoramic zoetropic video image is captioned, stored, deleted and or published and/or shared on social networks, social messaging services, email clients or other means of electronic communication.

11. A system for a 360° variable planar panoramic video image controller with instructions executed by a processor to: present on a display a set of alignment marks and/or an oval or circular reticle or similar visual guide enabling a user to maintain centripetal focus on a single plane or multiple planes of the video capture device in a continuous direction of the user throughout a 360° continuous directional physical rotation by user; present on a display a system of controls for the 360° variable planar panoramic video image controller that allows user to modify the default settings; present on a display an image of a progress indicator that utilizing a magnetometer or compass-like device embedded in the video capture device progressively tracks and displays the azimuth from 0° to 360° and/or illustrates a progressive rotation via a pie chart or similar animated graphic on the video capture screen to guide the user to complete a full 360° continuous directional physical rotation of the video capture device; receive from a user control a signal to commence video image (movie) capture which may either have a centripetal focus or a centrifugal focus from the center of the 360° physical rotation of the user; wherein the 360° variable planar panoramic video controller writes and appends frames during the 360° continuous directional physical rotation to the video image (movie); wherein the 360° variable planar panoramic video controller copies still images from the captured video image (movie) at pre-set or user specified intervals, e.g., every 10° throughout the entire 360° physical rotation; wherein concurrently or upon the completion of the video image (movie) capture the copied still images are automatically assembled into a 360° panoramic zoetropic video image of the user's immediate surroundings or centrifugally focused object, tableau or panorama; automatically stops the video image (movie) capture when the magnetometer detects that the electronic video capture device has completed a full 360° physical rotation (or a shorter user defined segment, e.g., 180° ), is stopped by user or is stopped after a defined amount of time has elapsed; receive from a user control a signal to stop continuous directional video capture at a heading and then a further user control to signal the restart of video capture from the same heading; present on a display the assembled 360° panoramic zoetropic video image or instruct or prompt the user to stitch together multiple video image captures in the event of non-continuous directional video capture to create a continuous 360° panoramic zoetropic video image for viewing, captioning, storage and/or deletion; store the 360 panoramic zoetropic video image as well as the full 360° panoramic video image and audio (movie) in the memory of the electronic video capture device for retrieval for publishing and/or sharing across social network services and social messaging service, future access and viewing on user's video capture device; and present on a display prompts for user to publish and/or share the 360° panoramic zoetropic video image via email clients, SMS text, social networks and/or social messaging services.

\* \* \* \* \*